United States Patent [19]
Horton

[11] Patent Number: 5,568,312
[45] Date of Patent: Oct. 22, 1996

[54] RELAY LENS SYSTEM FOR ENDOSCOPE

[75] Inventor: Richard F. Horton, Los Lunas, N.M.

[73] Assignee: Symbiosis Corporation, Miami, Fla.

[21] Appl. No.: 343,669

[22] Filed: Nov. 22, 1994

Related U.S. Application Data

[63] Continuation-in-part of Ser. No. 330,188, Oct. 27, 1994, and Ser. No. 330,369, Oct. 27, 1994.

[51] Int. Cl.$^6$ .............................. G02B 23/24; A61B 1/04
[52] U.S. Cl. .......................... 359/435; 359/362; 359/434
[58] Field of Search .................................. 359/362–363, 359/423–424, 434–435, 642, 648, 754, 763–769; 128/4, 6

[56] References Cited

U.S. PATENT DOCUMENTS

| | | | |
|---|---|---|---|
| 3,257,907 | 6/1966 | Hopkins | 409/86 |
| 4,168,882 | 9/1979 | Hopkins | 359/434 |
| 4,403,837 | 9/1983 | Nakahashi | 359/770 |
| 4,432,832 | 2/1984 | Fantone | 216/24 |
| 4,575,195 | 3/1986 | Hoogland | 359/716 |
| 4,662,725 | 5/1987 | Nisioka | 359/708 |
| 4,664,486 | 5/1987 | Landre et al. | 359/380 |
| 4,674,844 | 6/1987 | Nishioka et al. | 359/782 |
| 4,693,568 | 9/1987 | Takahashi | 359/772 |
| 4,721,372 | 1/1988 | Yokota | 359/658 |
| 4,723,843 | 2/1988 | Zobel | 359/435 |
| 4,784,118 | 11/1988 | Fantone et al. | 359/434 |
| 4,946,267 | 8/1990 | Hoogland | 359/435 |
| 5,142,410 | 8/1992 | Ono et al. | 359/434 |
| 5,296,971 | 3/1994 | Mori | 359/716 |
| 5,321,457 | 6/1994 | Imaizumi | 354/222 |
| 5,327,283 | 7/1994 | Zobel | 359/434 |
| 5,341,240 | 8/1994 | Broome | 359/435 |
| 5,359,377 | 10/1994 | Kamo | 354/222 |
| 5,359,453 | 10/1994 | Ning | 359/435 |
| 5,359,456 | 10/1994 | Kikuchi | 359/654 |
| 5,412,504 | 5/1995 | Leiner et al. | 359/435 |

*Primary Examiner*—Thong Nguyen
*Attorney, Agent, or Firm*—David P. Gordon

[57] ABSTRACT

A relay lens system for an endoscope is provided and includes three axially aligned cylindrical lens pairs, each lens pair having two substantially rod-like lenses. Each rod-like lens includes a convexo-concave polymeric aspheric lens and a concavo-convex polymeric aspheric lens which are symmetrically placed and affixed about a glass rod with flat ends by means of plano-convex optical cement lens elements. The optical cement lens elements form lens-like elements which contribute to both the color and geometric aberration correction of the lens system. When inserted as a component of an endoscope or laparoscope, the distal end of the relay lens system is axially aligned with an objective lens and the proximal end is axially aligned with a viewing eyepiece. The image formed at the distal end of the endoscope by the objective lens is transmitted by the relay lens system, which inverts once and refocuses twice before forming a final upright image in front of the eyepiece for viewing or recording.

11 Claims, 6 Drawing Sheets

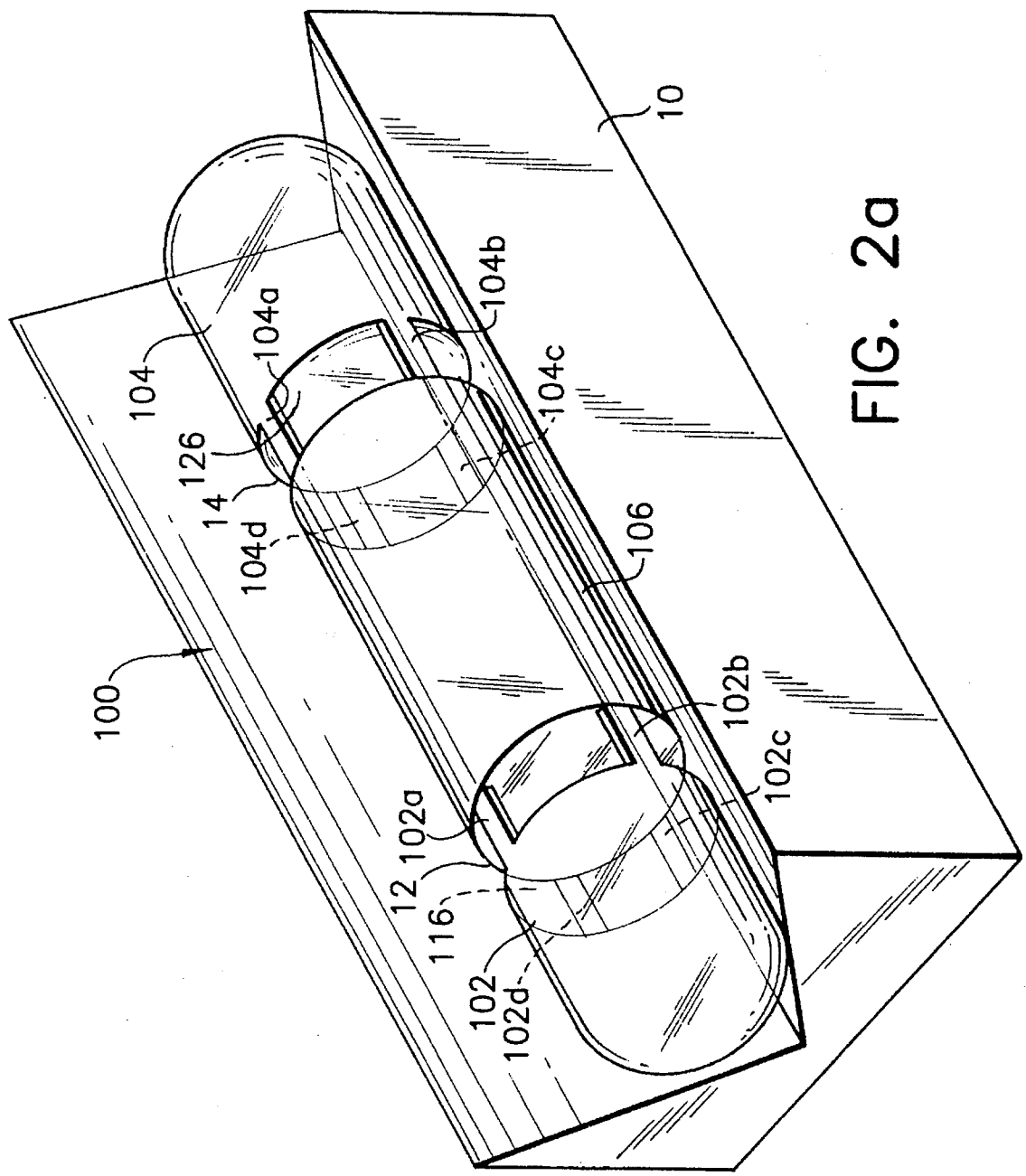

RELAY LENS SYSTEM FOR ENDOSCOPE

This application is a continuation in part of U.S. patent application Ser. No. 08/330,188, entitled "Objective Lens for Endoscope", and to U.S. patent application Ser. No. 08/330,369, entitled "Monolithic Relay Lens System Particularly Suited for Use in an Endoscope", both of which were filed on Oct. 27, 1994 and both of which are hereby incorporated by reference in their entireties herein.

BACKGROUND OF THE INVENTION

1. Field of the invention

This invention relates broadly to endoscopes and laparoscopes. More particularly, this invention relates to relay lens systems for endoscopes and laparoscopes.

2. State of the Art

Endoscopes are optical systems which are well known in the art for allowing the optical viewing of otherwise inaccessible areas within the human body without the use of excessive surgery. Besides minimizing the invasiveness of the surgery, endoscopes provide the advantage that, depending on the optical resolution of the endoscope, the taking of biopsy samples for later laboratory analysis may be unnecessary where direct endoscopic optical diagnosis is sufficient. Laparoscopes are specialized endoscopes which are primarily used to examine the peritoneal cavity (pertaining to the abdominal and pelvic cavities) of a patient.

Structurally, endoscopes generally include an airtight and waterproof elongated tube having a distal end placed within the body cavity of the patient to be examined, and a proximal end for optical viewing by the physician. The elongated tube is usually comprised of three significant optical parts: the objective lens; the relay system; and the eyepiece. The objective lens is located at the distal end of the tube, and forms a first inverted image of the observed area. The function of the relay lens system is to take the image formed by the objective lens, and to refocus and reinvert the first image several times in order to form a final upright image at the proximal end of the tube. The final upright image is then observed through the eyepiece by an observer (e.g., a surgeon).

A typical endoscopic relay lens system is made of seven identical and often symmetrical compound lenses, four of which act as field lenses and three of which act as imaging lenses. The field lenses are situated at the image planes of the relay system and serve to receive and keep together the image rays which are then refocused by the imaging lens into a new image. More specifically, in the seven relay lens configuration, the first inverted image focused at the distal end by the objective lens is reimaged twice before being formed into a final upright image at the proximal end for viewing through the eyepiece. Each lens component of the relay lens system is further typically made of at least two or more elements to correct for inherent chromatic and geometric (spherical, field curvature, astigmatic, coma) aberrations.

A problem that arises in designing adequate relay lens systems is that as the first inverted image is transmitted by the relay system from the distal end to the eyepiece, it loses brightness, contrast and definition.

The brightness of the image is related to the ratio of the focal length and the diameter of the lens through which the image is being focused. This ratio is also referred to as the f/number. The smaller the f/number, the brighter the image transmitted by the lens. It is therefore preferable in an endoscopic relay lens system to have an f/number as low as possible for the system so that as much image brightness as possible is transmitted from the objective lens to the eyepiece. While the system f/number more or less defines brightness, brightness is also lost due to absorption of energy by the lens media as well as well as unwanted reflection losses at lens element interfaces.

Contrast is degraded because of the scattered light from lens element media imperfections and the unwanted reflected light from lens interfaces contribute to a non-imaged background light which dilutes the image.

Definition of the image is lost due to aberrations of the optical system which results in a blurring of the image sharpness or resolution. This blurring increases as the image passes through successive lens elements.

The above mentioned deficiencies are at least partially addressed in U.S. Pat. No. 3,257,902 to Hopkins which discloses the use of rod-like glass lenses for the major part of the length of the relay lens system in an endoscope. These rod lenses exhibit lower effective f/numbers than conventional lenses, and, as a result, will transmit a brighter image than a conventional system over the same distance of the relay system; or conversely, an equally bright image will be transmitted by a rod lens system over a greater distance of the relay system than that transmitted by a conventional lens system. In addition, the use of rod lenses may allow the use of fewer reimaging and field lens elements resulting in fewer interfaces on which the light rays will be reflected and refracted in the system. However, the arrangement disclosed in the Hopkins patent is relatively complex and requires difficult optical fabrication of the glass rod lens elements. This leads to corresponding difficulties in high volume manufacturing. In addition, the Hopkins design fails to disclose whether its components are sufficiently temperature resistant such that they can be used in an autoclavable endoscope.

The shortcomings of the endoscope disclosed in the Hopkins patent were partially addressed in U.S. Pat. No. 4,784,118 to Fantone et al. which discloses a relay lens system for a disposable endoscope including inexpensive and easy to manufacture polymeric rod lenses. In spite of the improvements in the cost and method of manufacture of the polymeric rod lenses of the relay lens system disclosed by Fantone, that system still suffers from various astigmatic and chromatic optical aberrations. The design of the rod lens system in Fantone incorporates identical polymeric rod lenses having no additional lens elements for the correction of color or other aberrations inherent in an optical system. The image transmitted still lacks adequate brightness and clarity. The system disclosed in Fantone also fails to disclose an inexpensive autoclavable endoscope design with temperature resistant components, and in fact, the patent proposes lenses which would "melt" at autoclave temperatures.

Another problem that arises in the design of adequate relay lens systems is that inherent chromatic and geometric aberrations associated with lenses are compounded in an optical transmission system containing multiple field and imaging lenses. Although it is known in the art to use achromatic, aspheric and multiple lens configurations to correct these aberrations, it is more difficult to do so in longer optical transmission systems for the above mentioned reasons. The Fantone patent does not adequately correct for the chromatic and axial aberrations and the significant resulting image quality loss suffered during transmission of the image from the objective lens to the eyepiece.

SUMMARY OF THE INVENTION

It is therefore an object of the invention to provide a relay lens system for an endoscope which is simple in design and easy to manufacture.

It is also an object of the invention to provide a relay lens system for an endoscope having inexpensive components.

It is another object of the invention to provide a relay lens system for an endoscope having a high optical quality.

It is a further object of the invention to provide a relay lens system for an endoscope having geometric and chromatic corrective lens elements.

An additional object of the invention is to provide a relay lens system for an endoscope having lens components with small effective f/numbers.

Another object of the invention is to provide a relay lens system for an endoscope having lens components made up of glass rods with plastic lenses cemented to each end of the glass rods by means of an optical cement material.

A further object of the invention is to provide a relay lens system for an endoscope that is autoclavable.

In accordance with the objects of the invention, which will be discussed in detail below, a relay lens system for an endoscope is provided and includes three axially aligned cylindrical lens pairs, each lens pair being separated from the other lens pairs by an air gap, and each lens pair having two substantially rod-like lenses. The two rod-like lenses of each pair are also separated from each other by another air gap. Each rod-like lens includes two convexo-concave polymeric aspheric lens elements which are symmetrically placed at opposite ends of a long glass rod having flat ends and affixed to the rod by means of an optical cement material. The optical cement material forms a lens-like layer which contributes to both the color and geometric aberration correction of the five element lens. More particularly, a convexo-plano cement lens element is formed by optical cement material between one polymeric aspheric lens and one end of the glass rod, and a plano-convex cement lens element is formed by optical cement material between the the other aspheric lens and the other end of glass rod. This symmetrical, five element lens is repeated six times for the relay system.

When used as a component of an endoscope or laparoscope, the distal end of the relay lens system is axially aligned with an objective lens and the proximal end is axially aligned with a viewing eyepiece. The image formed at the distal end of the endoscope by the objective lens is transmitted by the relay lens system, which refocuses it twice before forming a final upright image in front of the eyepiece for viewing or recording.

The dissimilar indices and dispersion qualities of the three components (glass, cement, and a polymer) used to make a five element rod-like lens, as well as the air gaps between the rod lenses provide an improved correcting means for chromatic and geometric aberrations, and thus a high overall quality optical image. Furthermore, as the effective f/number of each relay lens element is small and there are fewer lens element interfaces, due to the use of rod shaped lenses, a brighter image will be transmitted over the length of the relay system.

The relay system is of a simple design and uses inexpensive parts. The reversable polymeric lens element can be mass produced using injection molding. Low temperature polymeric materials, such as polystyrene, are most easily injection molded and may be used to manufacture disposable and very inexpensive relay lens systems. Where a temperature resistant, autoclavable endoscope is preferred, a high temperature polymeric lens, such as polycarbonate, can be used. The glass rods are easily fabricated as they only have flat surfaces and do not require difficult machining. The optical cement element lenses are shaped by the flat ends of the glass rods and the concave surfaces of the polymeric lens elements. The lenses should be molded with the proper spaced standoffs at each end, such that the correct distance for the intervening optical cement between each lens element is achieved. Once manufactured, the lens elements may then be assembled in a "V block" or V-shaped slot, to insure that the axis of each lens in the cemented assembly is parallel and coaxial to molded tolerances. As the relay system is made up of alternating cylindrically symmetrical lens elements, the lens elements may be reversed during assembly without consequence to the relay system.

Additional objects and advantages of the invention will become apparent to those skilled in the art upon reference to the detailed description taken in conjunction with the provided figures.

BRIEF DESCRIPTION OF THE DRAWINGS

FIG. 2a is a perspective view of the "V block" use to assemble the relay lens system of the invention;

DETAILED DESCRIPTION OF THE PREFERRED EMBODIMENT

Figure 1:
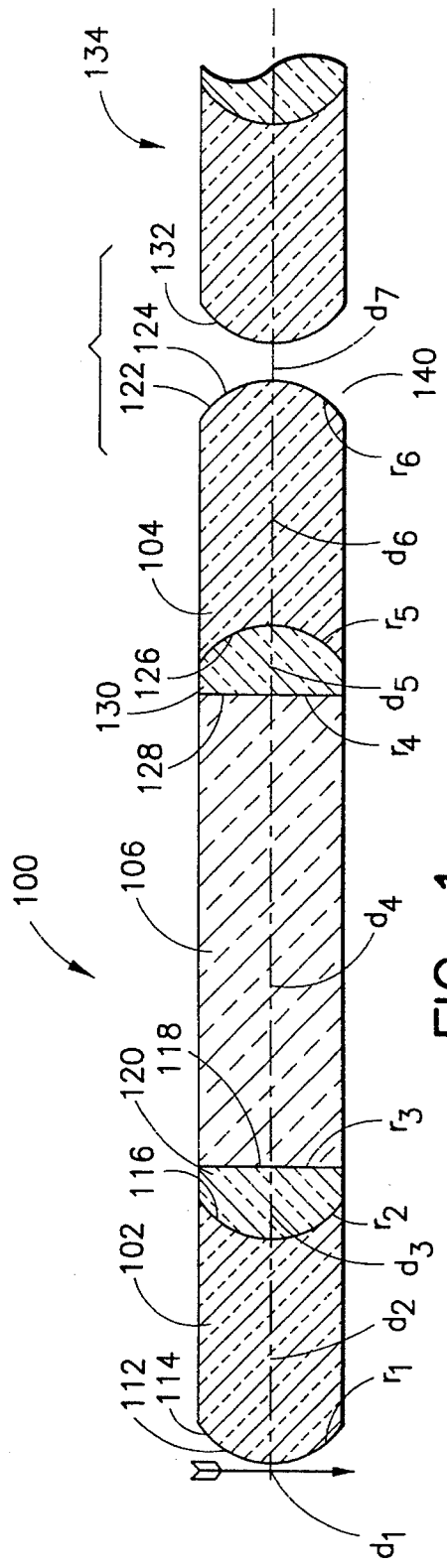
FIG. 1 is a detailed cross-sectional view of one full and one partial rod lens element used in the system of the invention.

Turning to FIG. 1, a detailed cross-sectional view of the rod lens element 100 of the invention is shown. The rod lens element 100 is cylindrical and generally includes a polycarbonate convexo-concave lens element 102, a polycarbonate concavo-convex lens element 104, a BK7 glass rod 106, a VTC2 optical cement convexo-plano lens element 120, and a VTC2 optical cement plano-convex cement lens element 130. The BK7 glass is manufactured by Schott Glaswerke, Mainz, Germany and the VTC2 (UV curing polymer) optical cement is manufactured by Sommers Laboratories, Fort Washington, Pa. The polycarbonate lenses 102, 104, glass rod 106, and cement lenses 120, 130 are axially aligned and are of substantially equivalent diameter.

The polycarbonate convexo-concave lens element 102 of the rod lens element 100 has a convex surface end 112 forming the outside end 114 of the rod lens element 100. It also has a concave end 116 affixed to a first flat end 118 of the glass rod 106, by means of the VTC2 optical cement lens element 120. It will be appreciated that the concave end 116 of the polycarbonate lens 102 and the planar surface 118 of the glass rod effectively mold the VTC2 optical cement into the VTC2 optical cement convexo-plano lens element 120.

The second polycarbonate lens 104 is substantially the same as the first polycarbonate lens 102 but reversed. The second polycarbonate lens 104 has a convex end 122 forming the inside end 124 of the rod lens element 100. Lens 104 also has a concave end 126 affixed to a second flat end 128 of the glass rod 106 by means of the VTC2 optical cement 130. As with optical cement lens element 120, the plano-convex optical cement lens element 130 is effectively formed from VTC2 optical cement by the concave end 126 of the polycarbonate lens 104 and the planar surface 128 of the glass rod.

As seen in FIG. 1, the convex inside end 124 of the rod lens element 100 is axially aligned with, and faces the outside end 132 of a second rod lens element 134 of similar composition and construction, thereby forming an inner air gap 140. The symmetrically aligned rod lens elements 100, 134 form a relay lens pair as discussed in greater detail below.

The polycarbonate lenses 102, 104 of the invention can be manufactured using an injection molding process. As polycarbonate is a high temperature plastic, and the glass rod and optical cement lens elements are also temperature resistant, a relay lens system incorporating these elements will be resistant to high temperatures and therefore usable in an autoclavable endoscope design. It is also possible to use a low temperature plastic with similar optical qualities to polycarbonate, such as polystyrene, where the endoscope is of a non-autoclavable design. As a low temperature plastic, polystyrene is even easier to manufacture by injection molding than polycarbonate.

The glass rod 106 is also easily manufactured as it does not require extensive machining or grinding of the lens surfaces. Glass rods may be manufactured in large quantities and stacked together like cord wood for polishing en masse. The glass rod elements of the rod lenses provide excellent color rendering ability, especially when used in a system comprising a large number of image transmission optical elements such as an endoscopic relay lens system.

As aforementioned, the optical cement lens elements 120, 130 of the invention are shaped by simply inserting the optical cement between the concave surfaces 116, 126 of the polycarbonate lenses 102, 104 and the flat ends of the glass rods 118, 128. The thickness of the cement elements 120 and 130 can be controlled by the use of spacers (shown and described below with reference to FIG. 2a) molded into the concave surfaces 116, 126 of the polycarbonate lenses 102, 104. The cement lens elements 120, 130 thus formed constitute additional achromatic lens layers and contribute to the correction of the chromatic and geometric aberration of the polycarbonate lenses. The cement lens elements are temperature resistant and thus suitable in an autoclavable endoscope design.

According to the preferred embodiment of the invention, the various dimensions and parameters of the rod lens element in FIG. 1 are as follows:.

| Component | | | |
|---|---|---|---|
| Air gap between pairs | d1: 1.00 | | |
| Polycarbonate (102) | r1: 16.386 | k1: 0.048 | n2: 1.585 |
| | d2: 10.257 | | v2: 30.3 |
| Cement (120) | r2: 6.199 | k2: 0.560 | n3: 1.458 |
| | d3: 0.936 | | v3: 43.8 |
| Glass (106) | r3: ∞ | k3: 0.00 | n4: 1.517 |
| | d4: 26.72 | | v4: 64.2 |
| Cement (130) | r4: ∞ | k4: 0.00 | n5: 1.541 |
| | d5: 0.936 | | v5: 43.8 |
| Polycarbonate (104) | r5: −6.199 | k5: 0.560 | n6: 1.585 |
| | d6: 10.257 | | v6: 30.3 |
| Air gap in pair | r6: −16.386 | k6: 0.048 | |
| | d7: 0.50 | | |

In the numerical data shown above, reference symbols d1 through d7 represent distances (in millimeters) between the respective lens surfaces of a component, reference symbols r1 through r6 represent radii of curvature (in millimeters) of the respective lens surfaces, reference symbols n2 through n6 represent refractive indices of the respective lenses, k1 through k6 represent the conic constant of the lens surfaces, and reference symbols v2 through v6 represent Abbe numbers of the respective lenses.

Those skilled in the art will appreciate that as the ratio of the length to the diameter of the rod lenses is increased, the system will appear to darken because of an increase in effective f/number of the system. The length of the rod lenses are thus optimized to allow for transmission of sufficient light while at the same time providing for an endoscope of sufficient length.

Figure 2:
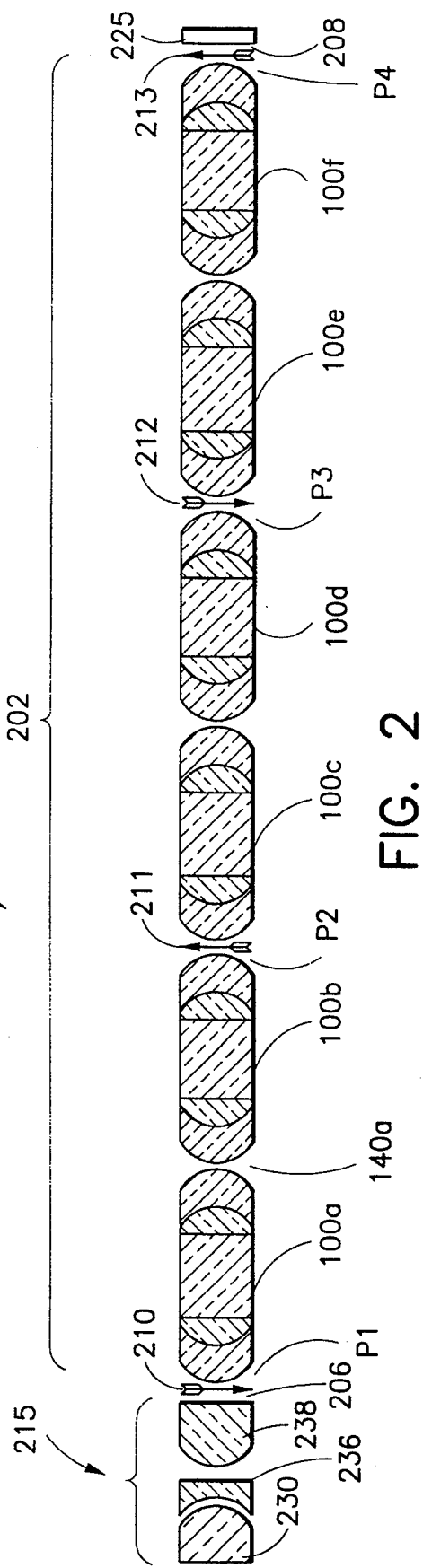
FIG. 2 is a cross-sectional view of the relay lens system of the invention as a component of an endoscope.

Referring to FIG. 2, the preferred embodiment of a full relay lens system 202 for an endoscope 200 is shown. The relay lens system 200 includes six axially aligned identical lenses 100a, 100b, 100c, 100d, 100e, 100f, separated by outer air gaps 140a, 140b, 140c, 140d, 140e. A distal air gap 206 and a proximal air gap 208 separate the relay lens system 202 from the objective lens 215 and the eyepiece 225 respectively. The six aligned lenses 100a, 100b, 100c, 100d, 100e, 100f, form three lens pairs, each pair inverting the image once. As illustrated, the number of lens pairs is preferably odd where no image inverting lens is situated at the eyepiece 225. Alternatively, the use of an additional inverting lens element (not shown) at the eyepiece 225 would allow an even number of relay lens pairs in the system. The relay lens system 202 transmits an image 210 formed by the objective lens 215 at location P1 of the endoscope 200 to the eyepiece 225 of the endoscope 200 as described in detail below.

In the preferred embodiment of the invention, the objective lens 215 has three optical elements. The first element is a plano-convex spherical sapphire lens 230 which combines the function of a hard exterior window and first optical element of the objective lens 215. The second and third elements are an aspheric polycarbonate lens 236 and a thick acrylic convexo-plano lens 238 respectively. Preferred embodiments of the objective lens are described in further detail in U.S. parent application Ser. No. 08/330,188 which was previously incorporated herein by reference.

The inverted image 210 formed by the objective lens 215 is transmitted by the first lens pair 100a, 100b of the relay system 202 to be refocused at location P2 as a second, upright image 211. The second image 211 is then reinverted by the second lens pair 100c, 100d to form a third, inverted image 212 at location P3. The third image 213 is reimaged a final time by the third lens pair 100e, 100f to form a fourth, upright, image 213 in front of the eyepiece 225 at location P4, which may incorporate photographic or video recording devices (not shown).

Turning now to FIG. 2a, the relay lens system 100 according to the invention is advantageously manufactured by molding the polycarbonate lenses 102, 104 with integral spacers 102a–d, 104a–d surrounding their respective concave surfaces 116, 126. The two lenses 102, 104 are laid in a V-block 10 with the glass rod 106 between them so that the spacers 102a–d and 104a–d abut respective planar ends of the rod 106. Optical cement is then introduced into the spaces 12, 14 as described above. When the cement hardens, the lens system 100 is removed from the V-block and the excess cement is removed.

Figure 3:
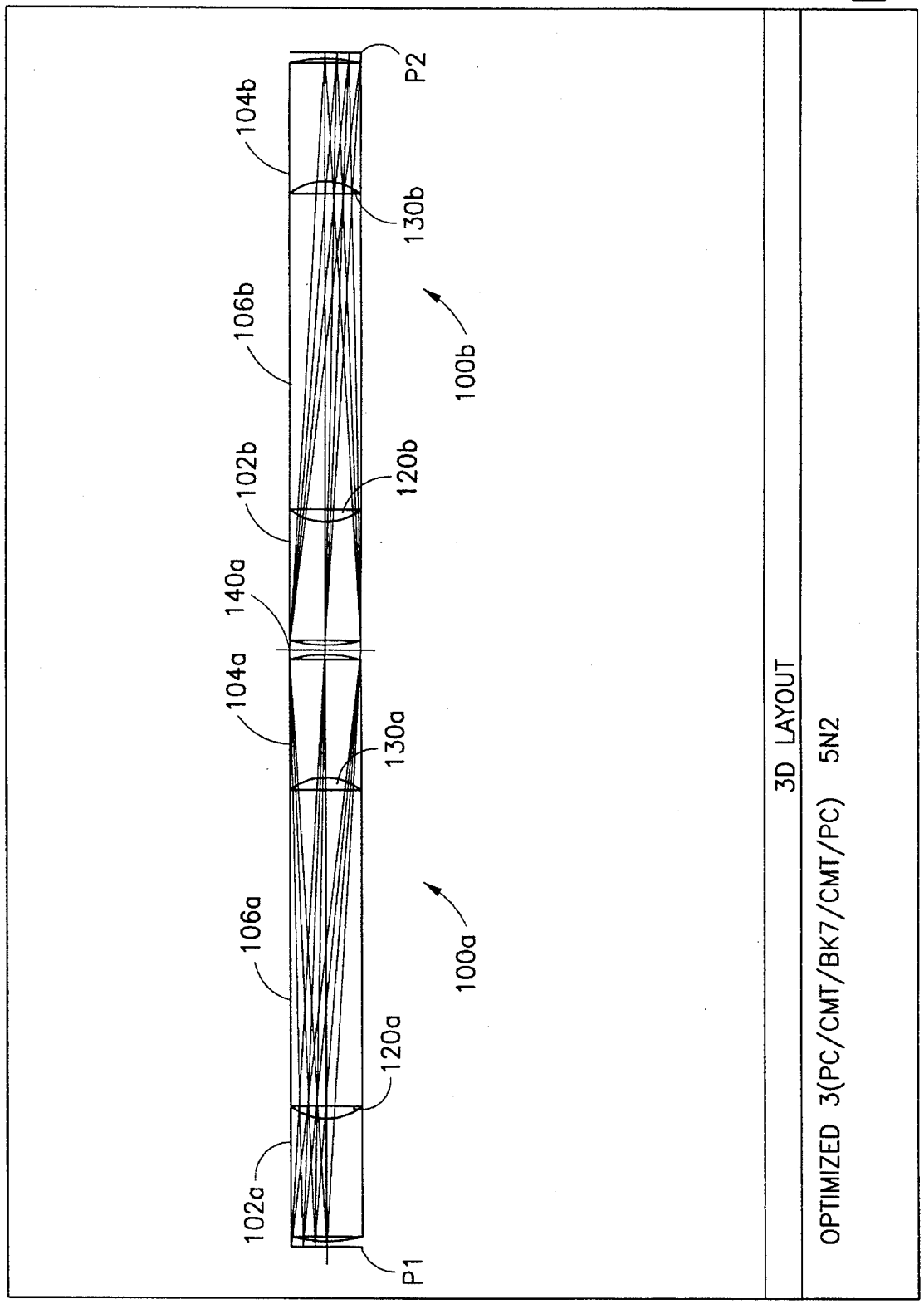
FIG. 3 is an optical layout illustrating the ray paths and image orientation through a relay lens pair of the invention.

FIG. 3 shows a cross-sectional view of a relay lens pair 100a, 100b with ray paths. Light from the first inverted image formed at P1 by the objective lens is collected by the polycarbonate lens 102a and transmitted through cement lens 120a, glass rod lens 106a, cement lens 130a, and polycarbonate lens 104a to air space 140a between relay lens 100a and 100b. From the space 140a, the light is collected by the polycarbonate lens 102b and transmitted through cement lens 120b, glass rod lens 106b, cement lens 130b, and polycarbonate lens 104b to form a second erect image at P2.

As shown in the above dimensions table and in the relay lens pair ray trace diagram of FIG. 3, the unique combination of the above mentioned materials in the five layer lens element 100 (polycarbonate/cement/glass/cement/polycarbonate) provides for high optical quality and reimaging. This superior quality is also due to the chromatic and geometric aberration correction effected by the symmetrical combination of the dissimilar indices of refraction and dispersion.

The f/number of the relay lens system, as shown in the scale drawing in FIG. 3, is approximately f/6 in air. This is typical of laparoscopic relay systems, where the f/number of the objective lens is matched to the relay system. Typically, focal lengths for laparoscopic objectives are in the 10 to 15 mm range with relatively small (<2 mm) effective apertures.

Figure 4:
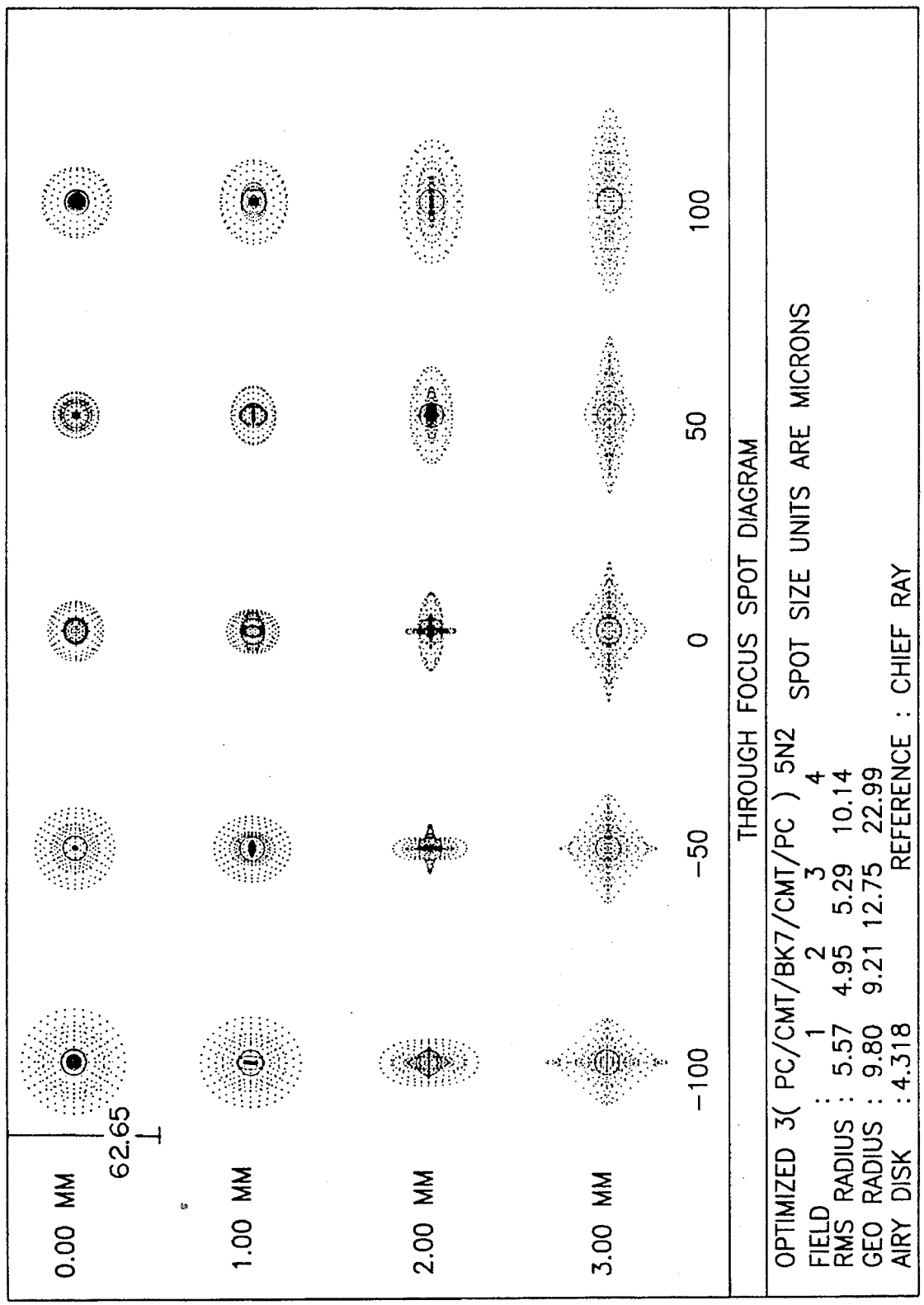
FIG. 4 shows raytrace data in the form of spot diagrams of the invention.

FIG. 4 is a plot of polychromatic "through focus spot diagrams" for central and three field positions corresponding to 1, 2, and 3 mm off the axis of the optical system. The spot sizes are consistent with nearly diffraction limited performance.

Figure 5:
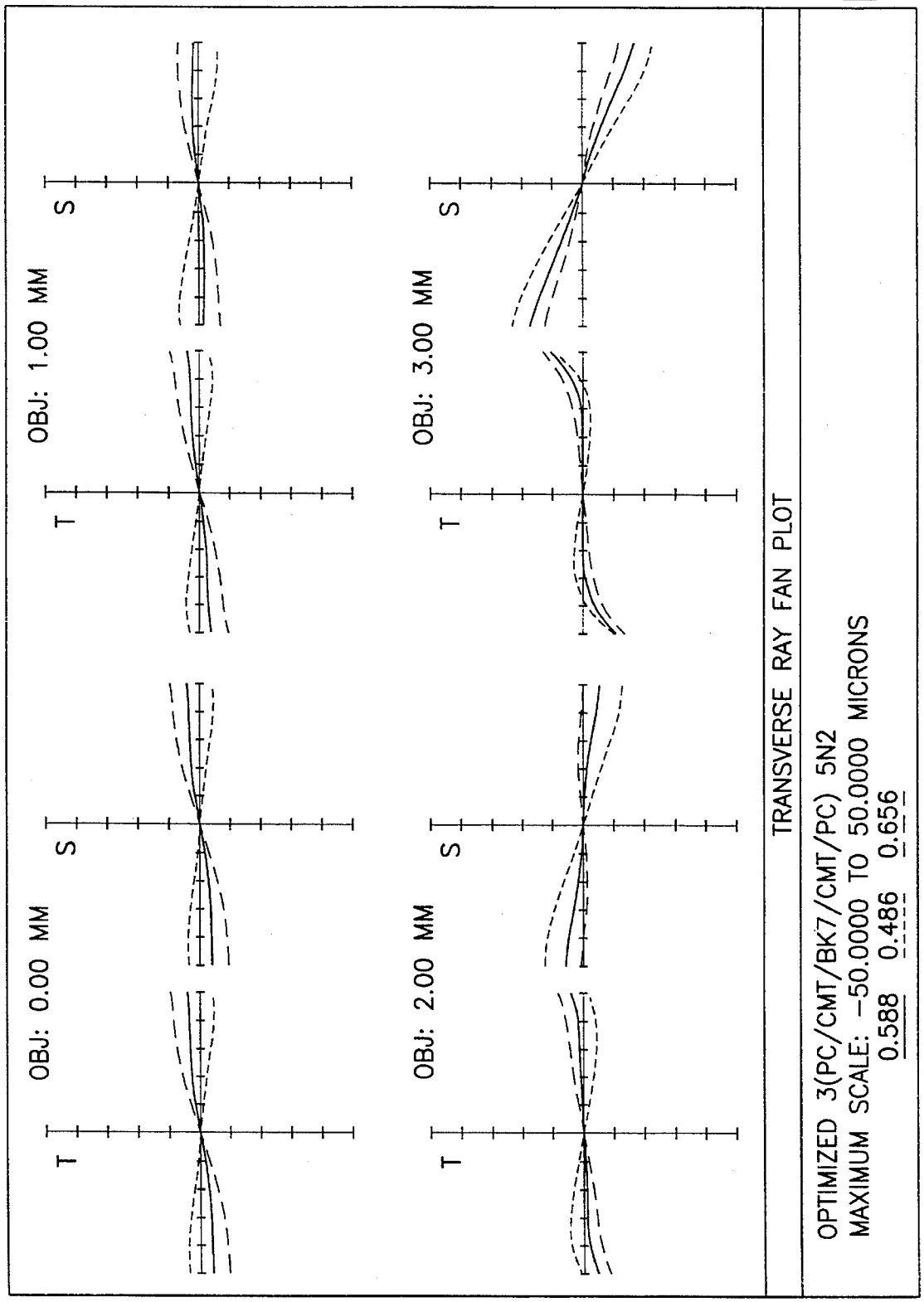
FIG. 5 shows raytrace data in the form of transverse ray fan plot diagrams of the second embodiment of the invention.

FIG. 5 is a plot of abberations in the form of "transverse ray fans" for the four field points.

Figure 6:
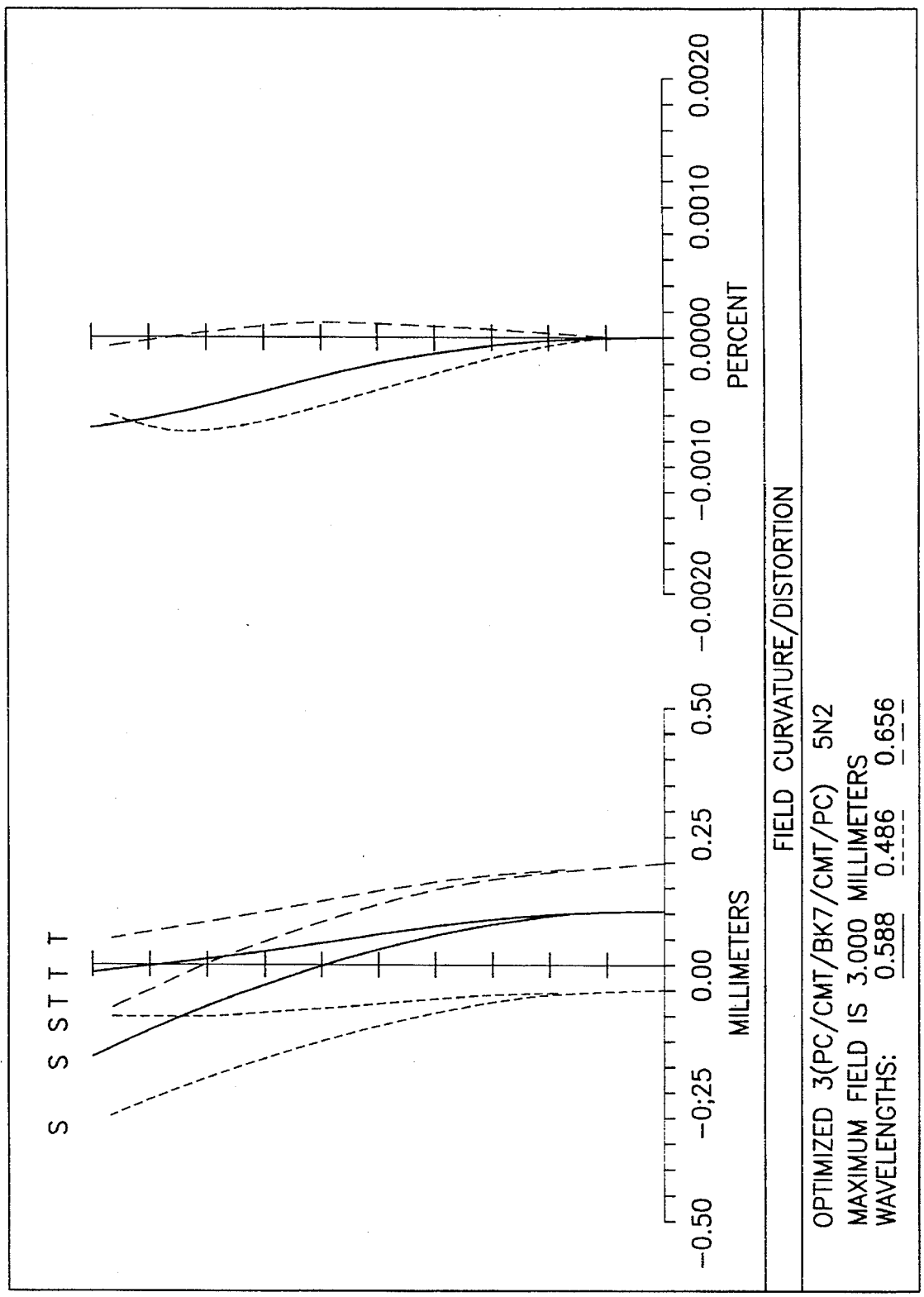
FIG. 6 shows raytrace data in the form of field curvature and distortion diagrams of the invention.

FIG. 6 is a plot of field curvature and distortion. Both these plots and spot diagrams are for three times reimaging system.

There have been described and illustrated herein a preferred embodiment of a relay lens system having rod lenses for endoscopes and laparoscopes. While particular embodiments of the invention have been described, it is not intended that the invention be limited thereto, as it is intended that the invention be as broad in scope as the art will allow and that the specification be read likewise. Thus, while particular polymers for the polymeric lens elements of the rod lenses have been disclosed, it will be appreciated that other polymers with similar optical properties can be used. Furthermore while a particular type of plastic optical cement has been disclosed it will be understood that any other optical cement with similar properties can be used. Also, while a BK7 glass rod was disclosed, it will be recognized that the glass rod may be of any other desirable glass type. Moreover, while particular configurations have been disclosed in reference to the number of rod lenses in a relay system, it will be appreciated that other configurations could be used as well. In addition, while a particular objective lens has been described, it will be appreciated that other suitable objective lenses can be used with the relay lens system of the invention. Furthermore, while particular methods of manufacture and assembly have been disclosed for the relay lens system, it will be understood that any other suitable method can be similarly used. It will therefore be appreciated by those skilled in the art that yet other modifications could be made to the provided invention without deviating from its spirit and scope as so claimed.

I claim:

1. A relay lens system for transmitting an image formed by an objective lens at the distal end of an endoscope to an eyepiece at the proximal end of the endoscope, the relay lens system comprising:
    at least one relay lens pair having axially aligned first and second substantially cylindrical rod lenses, each of said first and second rod lenses having
        a) a convexo-concave polymeric lens element having a convex surface and a concave surface, wherein said convex surface of said convexo-concave polymeric lens element forms an outside end for each of said first and second rod lenses,
        b) a concavo-convex polymeric lens element having a concave surface and a convex surface, wherein said convex surface of said concavo-convex polymeric lens element forms an inside end for each of said first and second rod lenses,
        c) a glass rod element having first and second flat ends,
        d) a convexo-plano optical cement lens element formed between and affixing said concave surface of said convexo-concave polymeric lens element and said first flat end of said glass rod, and,
        e) a plano-convex optical cement lens element formed between and affixing said concave surface of said concavo-convex polymeric lens and said second flat end of said glass rod.

2. A relay lens system according to claim 1, further comprising:
    a first air gap between an inner surface of said first rod lens and an outer surface of said second rod lens.

3. A relay lens system according to claim 1, wherein:
    said concavo-convex polymeric lens elements are both polystyrene lens elements.

4. A relay lens system according to claim 3, wherein:
    said convexo-plano optical cement lens element, and said plano-convex optical cement lens element are comprised of UV curing plastic cements.

5. A relay lens system according to claim 1, wherein:
    said concavo-convex polymeric lens elements are both polycarbonate lens elements.

6. A relay lens system according to claim 5, wherein:
    said convexo-plano optical cement lens element, and said plano-convex optical cement lens element are comprised of UV curing plastic cements.

7. A relay lens system according to claim 1, wherein:
    said convexo-plano optical cement lens element, and said plano-convex optical cement lens element are comprised of UV curing plastic cements.

8. A relay lens system according to claim 1, wherein:
    said at least one relay lens pair is an odd number of relay lens pairs.

9. A relay lens system according to claim 8, wherein;
    said at least one relay lens pair is at least three symmetrically aligned relay lens pairs.

10. A relay lens system according to claim 8, wherein:
    said at least one relay lens pair is at least three relay lens pairs.

11. A relay lens system according to claim 1, wherein:
    said at least one relay lens pair comprises a plurality of symmetrically aligned adjacent relay lens pairs,
    said relay lens system further comprising a second air gap between respective adjacent relay lens pairs.

* * * * *